(12) United States Patent
Crothers et al.

(10) Patent No.: US 10,924,584 B1
(45) Date of Patent: Feb. 16, 2021

(54) PROCESSING STREAMING CONTENT REQUESTS

(71) Applicant: Audios Ventures Inc., Troy, NY (US)

(72) Inventors: Steven Michael-Hafner Crothers, Chesterfield, MI (US); Alan Bradley Smith, Kingston, NY (US)

(73) Assignee: Audios Ventures Inc., Troy, NY (US)

( * ) Notice: Subject to any disclaimer, the term of this patent is extended or adjusted under 35 U.S.C. 154(b) by 0 days.

(21) Appl. No.: 16/587,952

(22) Filed: Sep. 30, 2019

(51) Int. Cl.
*G06F 15/16* (2006.01)
*H04L 29/08* (2006.01)
*H04L 29/06* (2006.01)
*H04L 12/911* (2013.01)

(52) U.S. Cl.
CPC .......... *H04L 67/325* (2013.01); *H04L 47/826* (2013.01); *H04L 65/608* (2013.01); *H04L 67/146* (2013.01); *H04L 67/02* (2013.01)

(58) Field of Classification Search
CPC ... H04L 67/325; H04L 65/608; H04L 67/146; H04L 47/826; H04L 67/02
See application file for complete search history.

(56) References Cited

U.S. PATENT DOCUMENTS 9,794,360 B1 * 10/2017 Farhangi ................. H04L 43/04
10,178,191 B1 * 1/2019 Farhangi ............... H04L 67/146

* cited by examiner

*Primary Examiner* — Cheikh T Ndiaye
(74) *Attorney, Agent, or Firm* — Fenwick & West LLP

(57) ABSTRACT

Systems and methods for tracking and identifying of a series of user requests in media streaming applications. Traditional media streaming requires a set of sequential, stateless user requests for content and do not support cookies or other user identification methods. The present application provides a framework for associating sequences of user media requests falling within a prescribed time window using multiple inputs to download requests for purposes of identifying and reconciling individual downloads.

20 Claims, 9 Drawing Sheets

PROCESSING STREAMING CONTENT REQUESTS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery service provider. As with content providers, content delivery service providers also provide requested content to client computing devices often with consideration of efficient transmission of the requested content to the client computing device and/or consideration of a cost associated with the transmission of the content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
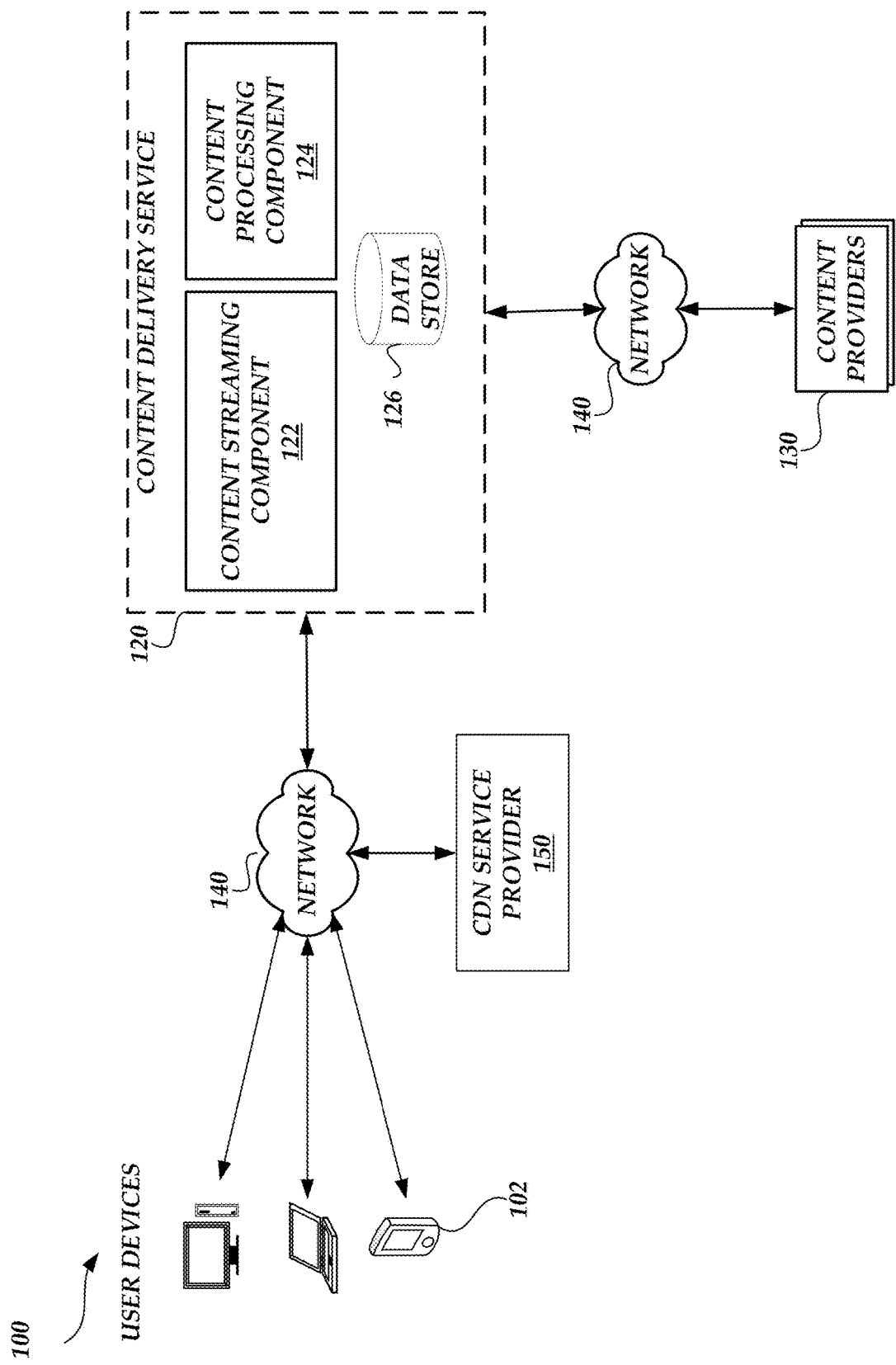
FIG. 1 is a block diagram of a content delivery environment that includes one or more user devices, a content delivery service, content delivery network service, provider and content provider according to one embodiment.

Generally described, aspects of the present application correspond to content delivery. More specifically, one or more aspects of the present application corresponds to systems and method for tracking and identifying of a series of user requests in media streaming applications. Illustratively, aspects of the present application correspond to a framework for associating sequences of user media requests that are associated with individual requests for sub-portions of the streaming content. A content processing system can process content requests received within a prescribed time window by inspecting multiple inputs, including, but not limited to, internet protocol (IP) address number and user's client user agent identification string. The content processing system then generate a processing result that identifies and reconciles a series of requests as individual downloads for processing of request tracking.

Generally described, content providers can provide content to requesting users. With regard to video content, a content provider can implement a content delivery service that is able to deliver video content to requesting users, such as video streaming. With regard to audio content, a content provider can implement a content delivery service that is able to deliver audio content to requesting users, such as podcasts or audio streams. Illustratively, a content provider indexes a collection of source audio content or video content (either live streaming or file-based) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a content provider can also provide advanced transmission features such as just-in-time packaging of content, digital rights management ("DRM") encryption, time-shifting, bitrate selection, and more.

In some embodiments, the video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

Still further, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format.

Generally, a content provider can generate a catalog identifying the content segments and encoded bitrates for each identified content segment. The catalog can be written into a manifest file that is provided to individual client computing devices that have requested content or written to a database for subsequent retrieval. Thereafter, once all the versions of an encoded segment are received by the packaging and origination service, the packaging and origination service is available to receive and process requests for encoded content. More specifically, client computing devices, through a respective software application, can request individual content segments according to the available encoded bitrates and formats as published as a manifest file or maintained in the database.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like. In other embodiments, audio streaming communication encoding can include Free Lossless Audio Codec ("FLAC"), Waveform Audio Format ("WAF"), Advanced Audio Coding ("AAC"), ALAC, Apple Lossless Audio Codec ("ALAC"), Audio Interchange File Format ("AIFF"), Direct Stream Digital ("DSD"), Moving Picture Experts Group Layer-3 Audio ("MP3") and the like.

Traditionally, media streaming applications on client device request content from the content provider. However, media streaming applications are generally stateless in terms of each individual transmission is not dependent on the behavior of previous transmissions. Additionally, most media streaming applications and do not support cookies or other user identification methods that facilitate any form of grouping or association of a set of content requests.

Because of the lack of statefulness and tracking capabilities associated with content requests, content providers can be inefficient or deficient in tracking media delivery. For example, may be experience difficulty in tracking how many impressions or downloads of a particular content stream have been delivered to individual users or groups of users. Such deficiencies create additional problems for reconciling downloads/streams for individual content providers, such as reconciling information related to payment based on downloads or advertisement rates related to number of impressions of content.

To address at least a portion of the inefficiencies described above with regard to processing content to generate or distribute content, aspects of the present application correspond to a service for facilitating the delivery of content and tracking of content request usage data. Generally, a video representation generation component receives content from a content provider, such as streaming audio content or streaming video content. The content provider can provide additional information about the audio content, such as metadata, that can be utilized to process the audio content into a subset of audio clips or audio segments. The metadata can include timing information that identifies one or more reference points in the audio content in which audio segments or clips may occur, such as chapter endings, scene or subject matter transitions, significant events (e.g., punchlines), and the like. The metadata can also include (additionally or alternatively) keywords or other indicia corresponding to the subject matter of the audio content or portions of the content that can be utilized to identify or group audio segments/clips. Such keywords can correspond to the topic/subject matter of the audio content, the originator of the audio content (e.g., speaker) or descriptive information.

The video representation generation component receives requests from users requesting streaming content. The content provider identifies the set of content segments or content sub-portions that correspond to the requested content and provides identification information for each content segment to the requesting user device. In turn the user device can then sequentially transmit requests for individual content segments in accordance with an established communication protocol or streaming protocol. Each individual segment or sub-portion request can include limited identification information, such as host name, path, user agent identifiers, network address of the requesting media application, and segment identification information (such as a byte range or unique segment identifier).

In one aspect, a content streaming component or service of the content delivery service processes the content requests in a manner to facilitate the delivery of the requested content to the media application. Additionally, a content processing component or service further record the content request and the associated identification information. For a first received or processed request, the content processing component generates a unique reference identifier that facilitates the associated of all subsequently received or processed content requests within a defined time window. Illustratively, the time window can correspond to at least a minimal time window corresponding to the length of the requested content or some larger increment. Each received content request causes the adjustment of the timing window and accordingly, the process continues until no content request is received within the last adjustment of the time window. Thereafter, the content processing component can collate all the received independent content requests within the time window to generate content request usage information. Such content request usage information can illustratively identify individual complete downloads or partially complete downloads of identified content and can be utilized to facilitate reconciliation for the content provider and content delivery service.

Although one or more aspects of the present application will be described with regard to illustrative streaming protocols, content lengths or types of streaming content (e.g., audio streaming or video streaming), one skilled in the relevant art will appreciate that additional or alternative examples may be within the scope of the present application. Accordingly, the disclosed examples and illustrations should not be construed as limiting.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a content delivery service 120. Illustratively, the content delivery service 120 can correspond to one or more services utilized in the transmission of the encoded content to user device 102. The content delivery service 120 can include one or more services that index a collection of source content (either live streaming or file-based audio content), generates one or more video representations of the audio content, and deliver the source content to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. The content can be illustratively provided by one or more origin sources, such as original content provider 130.

User computing devices 102 may include any number of different computing devices capable of communicating with the networks 140 via a direct connection or via an intermediary. For example, individual computing devices may correspond to a laptop, tablet computer, personal computer, wearable computer, server, personal digital assistant (PDA), hybrid PDA/mobile phone, mobile phone, electronic book reader, set top box, camera, appliance (e.g. a thermostat or refrigerator), controller, digital media player, watch, glasses, a home or car device, Internet of Thing ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein.

Networks 140 may be any wired network, wireless network, or combination thereof. In addition, the networks 140 may be a personal area network, local area network, wide area network, cable network, fiber network, satellite network, cellular telephone network, data network, or combination thereof. In the example environment of FIG. 1, network 140 is a wide area network ("WAN") or global area network ("GAN"), such as the Internet. Protocols and components for communicating via the other aforementioned types of communication networks are well known to those skilled in the art of computer communications and thus, need not be described in more detail herein. While each of the client computing devices 102 and the content delivery service 120 are depicted as having a single connection to the network 140, individual components of the client computing devices 102 and content delivery service 120 may be connected to the network 140 at disparate points. Accordingly, communication times and capabilities may vary between the components of FIG. 1. Likewise, although FIG. 1 is illustrated as having separate networks 140, one skilled in the relevant art will appreciate that the content delivery service 120 may utilize any number or combination of networks.

In accordance with embodiments, for purposes of illustration, the content delivery service 120 includes one or more servers for receiving content from original content providers 130 and processing the content. As described in further detail below, the content delivery service 120 can include a content processing component 122 for processing content and generating streaming content for delivery to users. The content delivery service 120 can also include a content processing component 124 that can be utilized to collect information regarding received content requests from user devices and generate content request usage information based on processing the collected information. In some embodiments, the content processing component 124 may be considered a separate service or component to the content streaming application 122. Alternatively, the content streaming application 122 and the content processing component 124 may be integrated or combined into a single component or service. The content delivery service 120 can further include a data store 126 for maintaining the collected content request information or content request usage information as described herein.

It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one or more virtual machines implemented in a hosted computing environment. A hosted computing environment may include one or more rapidly provisioned and released computing resources, which computing resources may include computing, networking or storage devices. Accordingly, while such components are illustrated as being logically grouped in FIG. 1, one skilled in the relevant art will appreciate that one or more aspects of the present application can include the content delivery service 120 as being implemented in multiple geographic areas. Additionally, not all geographic areas hosting portions of the content delivery service 120 will necessarily have all the same components or combination of components.

With continued reference to FIG. 1, the content delivery environment 100 also includes original content providers 130. Illustratively, the original content provider can include a plurality of servers for generating and transmitting content to the content delivery service 120. Illustratively, the content can include audio streaming content, audio segments, video files including audio content, video representations of audio segments (pre-processed) and the like. Although illustrated as separate components, the content providers 130 and user devices 102 can correspond to the same computing device, such as a user device that generates audio content and uploads it to the content delivery service and also interacts with the content delivery service 120 to create video representations of the uploaded content.

In some embodiments, a CDN service provider 150 may include multiple edge locations from which a user device can retrieve content. Individual edge locations may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. The CDN service provider 150 may include multiple POPs located in different geographic locations so that user devices can communicate with a nearby a POP to retrieve content, thereby reducing the latency of delivering requested content.

Figure 2:
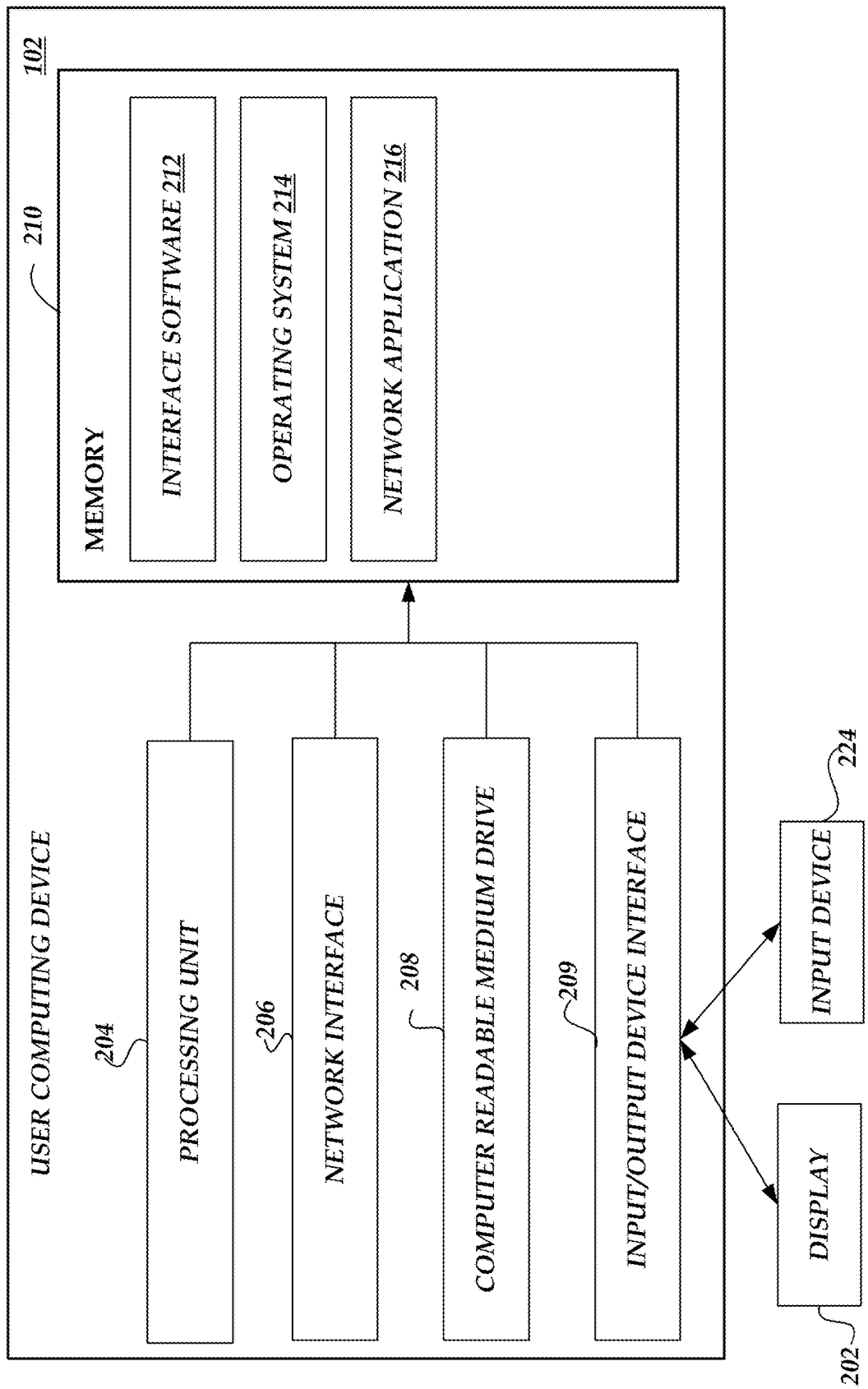
FIG. 2 is a block diagram of illustrative components of a user computing device configured to transmit requests for content in accordance with an illustrative embodiment.

FIG. 2 depicts one embodiment of an architecture of an illustrative user computing device 102 that can generate content requests and process requests for content in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the content delivery service 120 or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the content delivery service 120. Additionally, the network application 216 can interface with one or more social media network resources, such as a web site, for publishing video representations of the audio content.

Figure 3:
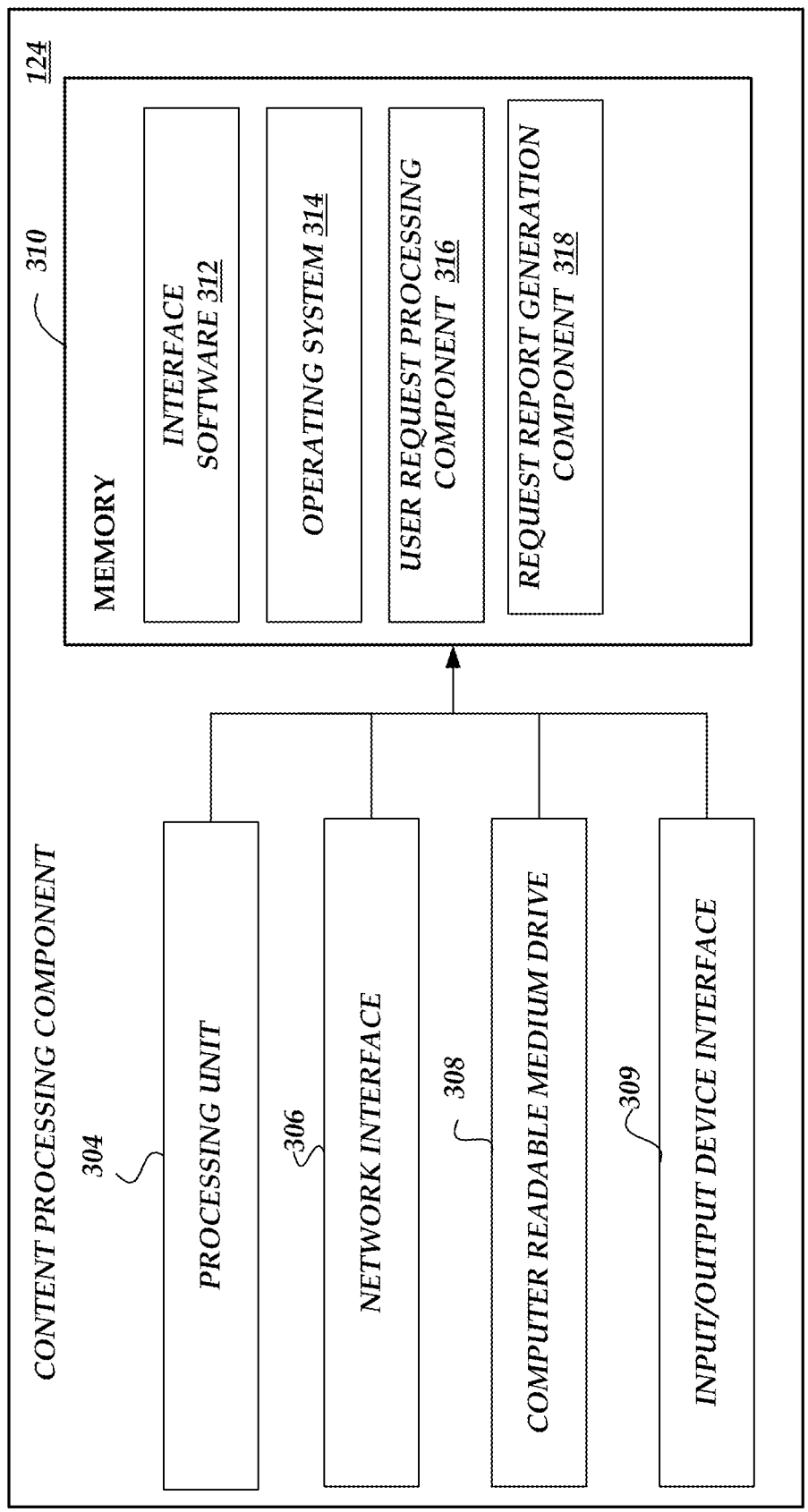
FIG. 3 is a block diagram of illustrative components of content processing component configured to provide content and generate content request usage information in accordance with an illustrative embodiment.

FIG. 3 depicts one embodiment of an architecture of an illustrative computing device for implementing various aspects of the content processing component 124 in accordance with aspects of the present application. The content processing component 124 can be a part of the instantiation of one or more virtual machine instances. Alternatively, the content processing component 124 may be a stand-alone device.

The general architecture of the content processing component 124 depicted in FIG. 3 includes an arrangement of computer hardware and software components that may be used to implement aspects of the present disclosure. As illustrated, the content processing component 124 includes a processing unit 304, a network interface 306, a computer readable medium drive 308, an input/output device interface 309, all of which may communicate with one another by way of a communication bus. The components of the content processing component 124 may be physical hardware components or implemented in a virtualized environment.

The network interface 306 may provide connectivity to one or more networks or computing systems, such as the network of FIG. 1. The processing unit 304 may thus receive information and instructions from other computing systems or services via a network. The processing unit 304 may also communicate to and from memory 310 and further provide output information. In some embodiments, the content processing component 124 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the content processing component 124. The memory 310 may further include computer program instructions and other information for implementing aspects of the present disclosure. For example, in one embodiment, the memory 310 includes interface software 312 for receiving and processing requests from user devices 102, the content providers 130 or transmitting processed results. Memory 310 includes a user request processing component 316 for processing received content requests as described herein. The memory 310 further includes a request reporting processing component 318 for generating content request usage information as described herein.

The content processing component 124 illustrated in FIG. 3 can be implemented as physical computing devices or virtualized computing devices in a computing network. In another embodiment, the content processing component 124 may be implemented as logical components in a virtual computing network. Thus, aspects of the present application should not be limited to interpretation requiring a physical, virtual or logical embodiment unless specifically indicated as such.

Figure 4A:
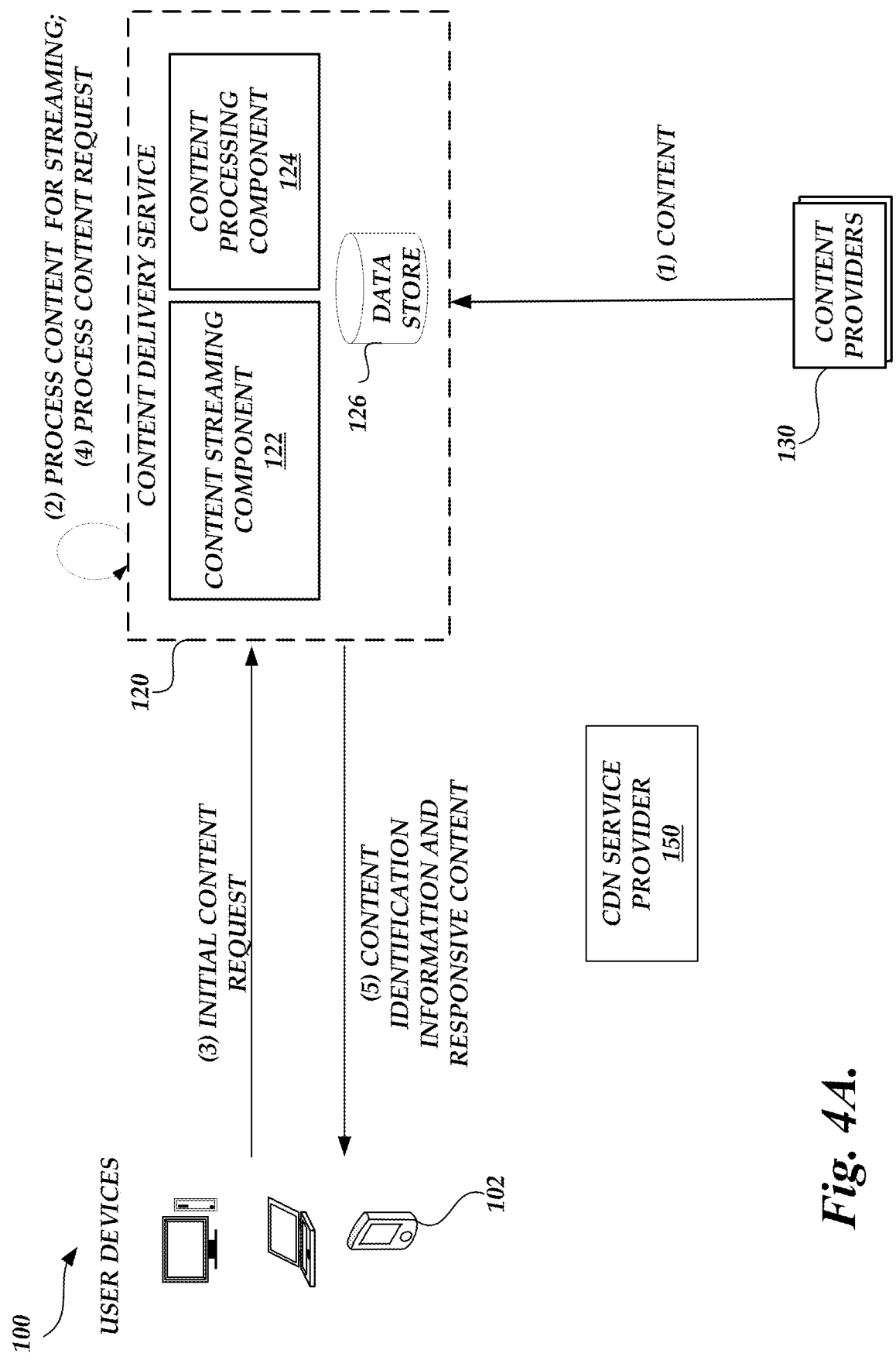
FIGS. 4A-4C are block diagrams of the content delivery environment of FIG. 1 illustrating the interaction related to the processing of requests for content and generation of content request usage information in accordance with an illustrative embodiment.
Figure 4B:
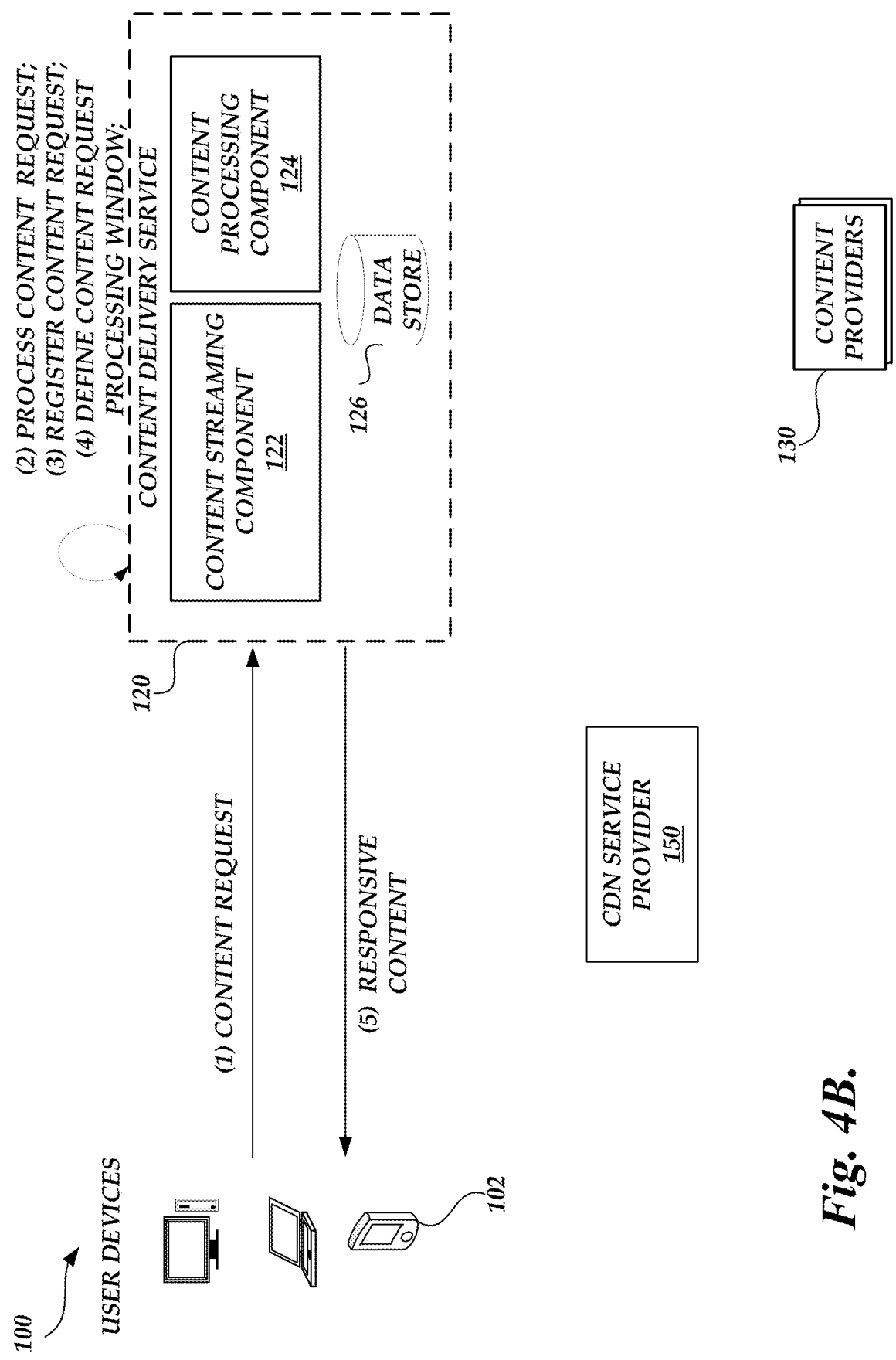
Figure 4C:
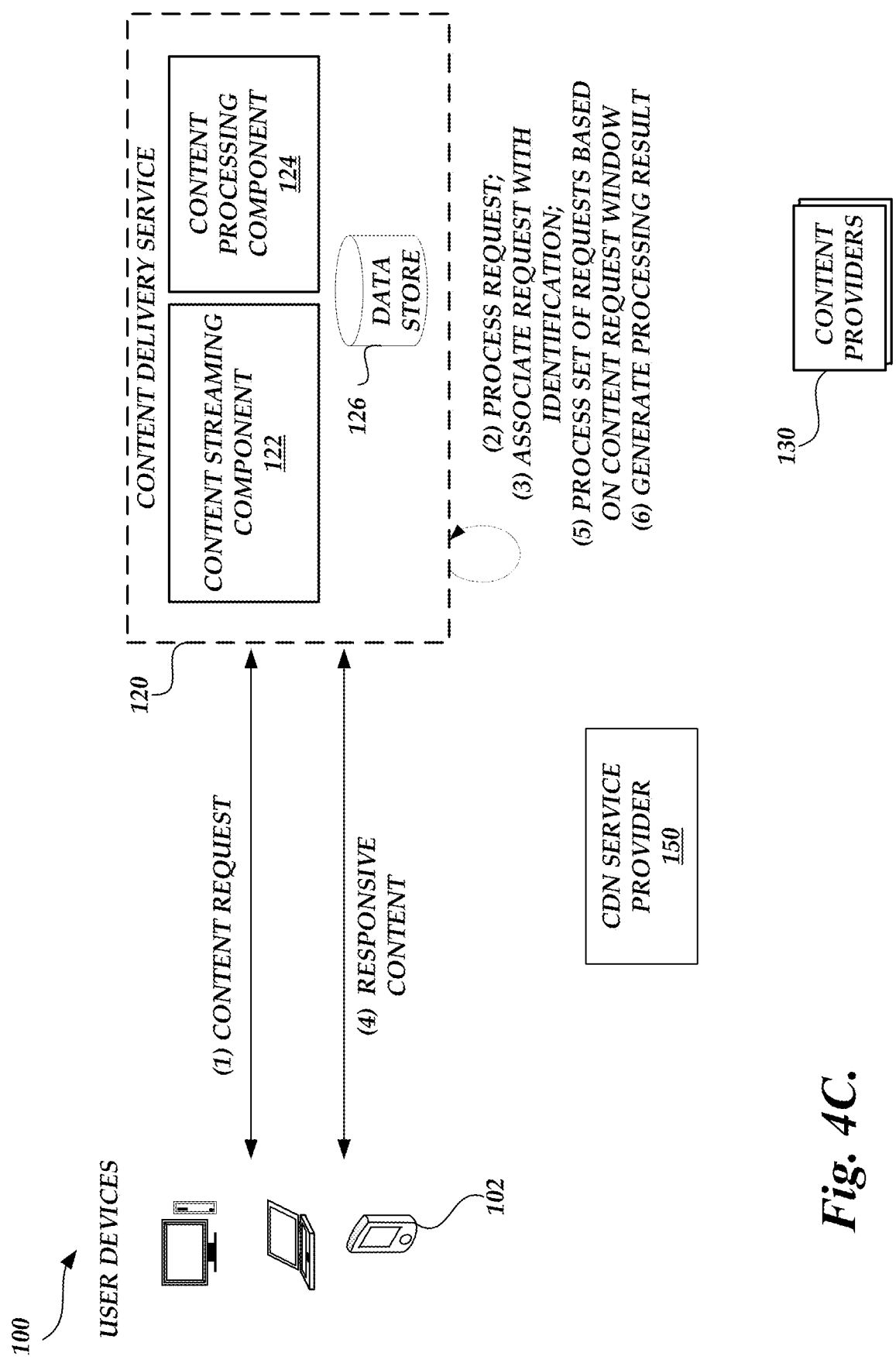

With reference to FIGS. 4A-4C, illustrative interactions of at least a subset of the components of the content delivery environment 120 to process requests for content to generate content request usage information will be described. As described above, the content can illustratively include audio content, video content or combinations that can be subdivided into one or more segments or clips. Illustratively, the content may correspond to streaming audio content, video files including an audio content portion or video representations previously created by the content provider 130 and provided to content delivery service 120. With reference first to FIG. 4A, illustrative interactions for the initial processing of the audio content will be described. At (1), the content delivery service 120 obtains the content. Illustratively, the content can be provided by one or more content providers 130, such as via a content stream or other transmission. The requested content can include additional encoded data (e.g., video) that includes an audio data portion that can be identified or parsed. Additionally, in some embodiments, the content can also be associated with metadata that facilitates the processing of either the audio content, video files, or the video representations. In one example, the metadata can include timing information that identifies one or more reference points in the audio content in which audio segments or clips may occur, such as chapter endings, scene or subject matter transitions, significant events (e.g., punchlines), and the like. The metadata can also include (additionally or alternatively) keywords or other indicia corresponding to the subject matter of the audio content or portions of the content that can be utilized to identify or group audio segments/clips. Such keywords can correspond to the topic/subject matter of the audio content, the originator of the audio content (e.g., a speaker or group of speakers) or other descriptive information.

At (2), the content streaming application 122 processes the received content for purposes of facilitating the delivery of the content to one or more users. The processing can include decoding and encoding the content in accordance with established bitrate and format combinations, combining the received content with supplemental content, such as identifiers, advertisements, and the like, modifying the content in accordance with preferences, such as user profiles, replicating the content for parallel streaming, and the like.

At (3), the content streaming application 122 receives an initial request from a user device for content. As illustrated in FIG. 4A, the user device 102, through a media application, transmits a request for generation of video representations. Illustratively, the request for can be generated by a user device 102 that has access to content or can identify requested content. For example, a user device 102 may be accessing a network resource, such as a web page or network application that is capable of streamed audio content or downloaded audio content. The initial response can include a specific identifier corresponding to the content. Alternatively, the initial response can include search criteria that can be utilized to determine content responsive to the criteria. Such criteria can include, but is not limited to, genre, content provider, actors, price, quality, recommendations, and the like. At (4), the content streaming application 122 identifies the requested streaming content (or multiple identifiers), prepares the content delivery service 120 for streaming and transmits the responsive information to the requesting user device 102. For example, the content streaming application 122 can transmit authentication or authorization information to the media application, manifest information, encryption keys, streaming server network credentials or identifiers and the like. At this point, the user device 102 and content delivery service (through the content streaming application 122) are prepared to begin a sequence of transmissions relating to the streaming of content to the user device.

Turning now to FIG. 4B, illustrative interactions of at least a subset of the components of the content delivery environment 120 to process content requests will be described. At (1), the user device 102, through a media application, transmits a request for content. Illustratively, the request for can be generated by a user device 102 responsive to the previous response from the content delivery service 120 identifying the available content segments or sub-portions. Each individual user device request includes some identification information that corresponds to a stateless media application on the user device. Such information includes host name, path, user agent or media application identification information, network address of the user device, and requested byte range information identifying the specific requested segment of content.

At (2), the content streaming application 122 processes the request to determine the requested content segment and causes the preparation of one or more components for transmission of the requested content to the user device 102. Such processing can include additional steps and components not described herein.

For purposes of illustration, the interaction of FIG. 4B correspond to the first request for content segment that is transmitted by the user device 102 or received at the content delivery service 120. Accordingly, at (3), the content processing component 124 registers the first content request with an assigned reference identifier. Illustratively, the content processing component 124 associates a unique identifier, such as an assigned global identifier, hash, partial hash and the like with one or more attributes of the content request. For example, the content processing component 124 can associated the reference identifier with network address and user agent identifier of the users. As will be described below, the reference identifier will be assigned to all subsequently received content requests having matching attributes. The reference identifier is illustratively utilized by the content processing component 124 and is not provided to the user device 102. Additionally, the reference identifier is not included in any subsequent user content requests because the media application does not support stateful tracking (e.g., cookies or other identifiers) or otherwise such stateful tracking is not enabled.

At (4), the content processing component 124 defines that content request window that will be utilized to associate all content requests with a common identifier as corresponding to a "same" request. Illustratively, the content request window corresponds to a length of time defined by a minimal length of the total streamed content. In other embodiments, the content request window corresponds to a multiple of the length of the total streamed content. Still further, in other embodiments, the content request window corresponds to fixed increment of time or increments of time that are predetermined to define the content request window.

At (5), the content streaming application 122 illustratively transmits the requested content segment and initializes a set of subsequent requests/transmissions corresponding to the streamed content.

With reference now to FIG. 4C, at (1) the user device 102, through a media application, transmits a set of subsequent requests for content. Illustratively, the request for content can be generated by a user device 102 responsive to the previous response identifying the available content segments or sub-portions and receipt of the previously requested segment (e.g., identifying the next byte range to be requested). In some embodiments, the streaming of content may be temporarily paused, so the subsequent transmissions may be dependent on receipt of the previous received segment. As described above, each individual user device request includes some identification information that corresponds to a stateless media application on the user device. Such information includes host name, path, user agent or media application identification information, network address of the user device, and requested byte range information identifying the specific requested segment of content.

At (2), the content streaming application 122 processes the request to determine the requested content segment and causes the preparation of one or more components for transmission of the requested content to the user device 102. Such processing can include additional steps and components not described herein. At (3), the content processing component 124 processes the next content request by attempting to determine whether reference identifier has been previously assigned. For example, the content processing component 124 can associated the reference identifier with network address and user agent identifier of the users. Illustratively, all content requests received with a specified time window will be given the same reference identifier based on matching attributes. At (4), the content streaming application 122 illustratively transmits the requested content segment and initializes a set of subsequent requests/transmissions corresponding to the streamed content.

During each respective receipt of content request or based on a collection of a set of requests, the content processing component 124 processes the requests to determine whether the content requests should be grouped together. As described herein, once no additional content requests are received within the context of the time window (e.g., the sliding time window), the content processing component 124 will consider the grouping of content requests closed. More specifically, at (5), the content processing component 124 processes each subsequently received content request from as corresponding to the same request if the request is received within the time window, which can be generally referred to as a sliding time window. The time window adjusts with each received request such that the latest received request represents a starting point for the time window. The process repeats until no additional content request is received within the last adjustment of the time window. The adjustment of the timing window can incorporate pausing or repeated requests, which is generally considered to be part of the same request.

Illustratively, once the last request is considered to be detected (e.g., the expiration of the time window), the content processing component 124 can consider the streaming request complete or otherwise terminated. At (6), the content processing component 124 generates a processing result related to the grouping of content requests. The processing result can include an identification of the number of requested segments, a number of repeated segments or adjusted transmissions, performance information associated with transmissions (including network and service performance metrics), attributed costs for the transmission in terms of resources consumed, and the like. The content request usage information can be transmitted, stored or otherwise processed based on different configurations.

Figure 5A:
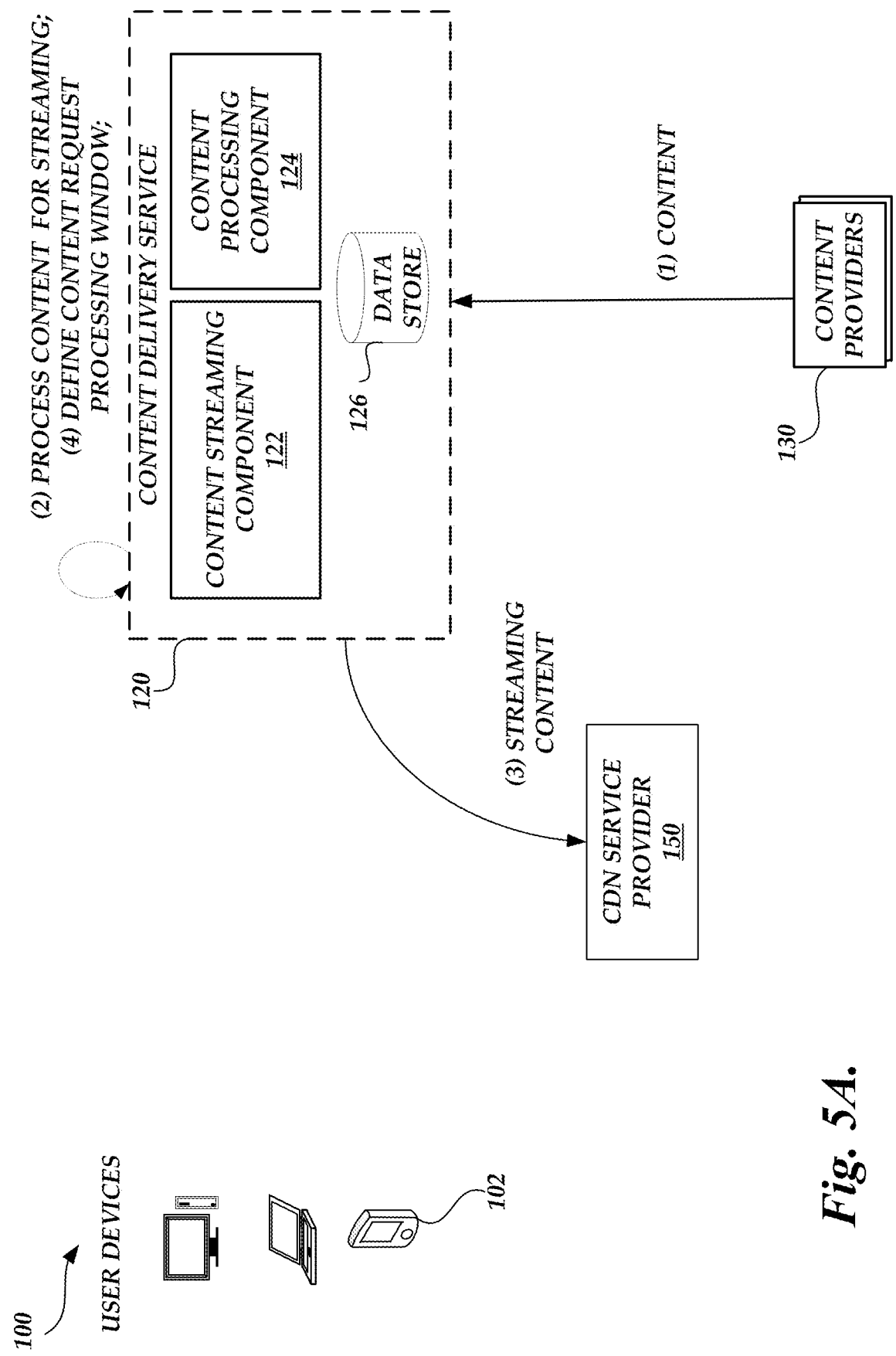
FIGS. 5A and 5B are block diagrams of the content delivery environment of FIG. 1 illustrating the interaction related to the processing of requests for content and generation of content request usage information in accordance with an alternative illustrative embodiment.
Figure 5B:
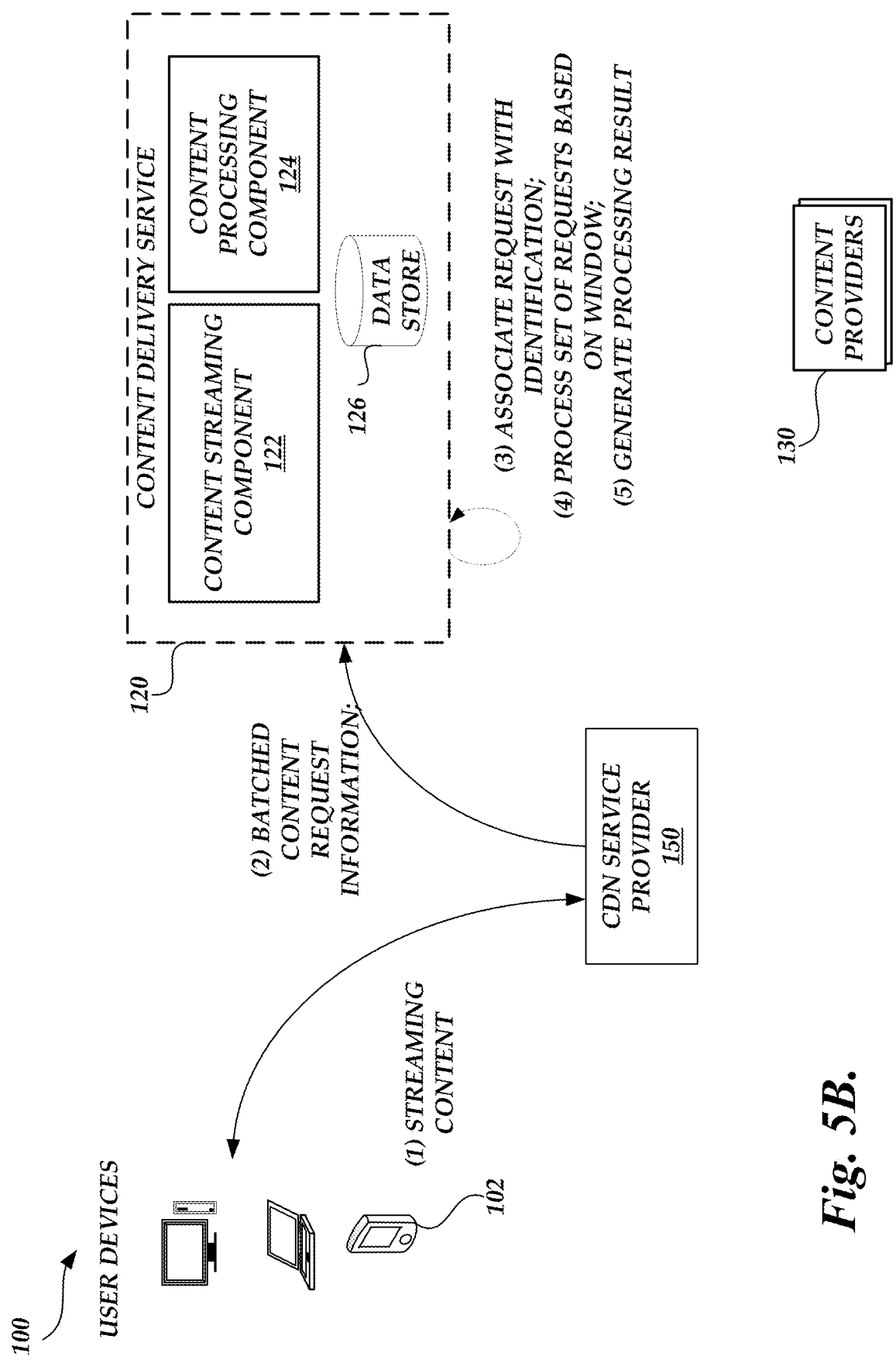

With reference now to FIGS. 5A and 5B, in another illustrative embodiment, the CDN service provider 150 may be utilized to transmit portions of the requested content. Accordingly, in this embodiment, the content delivery service can process individual, real-time, substantially real-time, or batched reports from the CDN service provider 150. With reference first to FIG. 5A, the content can be provided by one or more content providers 130, such as via a content stream or other transmission. The video content can include an audio data portion that can be identified or parsed. Additionally, in some embodiments, the content can also be associated with metadata that facilitates the processing of either the audio content, video files, or the video representations. In one example, the metadata can include timing information that identifies one or more reference points in the audio content in which audio segments or clips may occur, such as chapter endings, scene or subject matter transitions, significant events (e.g., punchlines), and the like. The metadata can also include (additionally or alternatively) keywords or other indicia corresponding to the subject matter of the audio content or portions of the content that can be utilized to identify or group audio segments/clips. Such keywords can correspond to the topic/subject matter of the audio content, the originator of the audio content (e.g., a speaker or group of speakers) or other descriptive information.

At (2), the content streaming application 122 processes the received content for purposes of facilitating the delivery of the content to one or more users. The processing can include decoding and encoding the content in accordance with established bitrate and format combinations, combining the received content with supplemental content, such as identifiers, advertisements, and the like, modifying the content in accordance with preferences, such as user profiles, replicating the content for parallel streaming, and the like. At (3), the content streaming application 122 transmits at least a portion of the processed content to the CDN service provider 150 that will interface with the user device.

At (4), the content processing component 124 defines that content request window that will be utilized to associate all content requests with a common identifier as corresponding to a "same" request. Illustratively, the content request window corresponds to a length of time defined by a minimal length of the total streamed content. In other embodiments, the content request window corresponds to a multiple of the length of the total streamed content. Still further, in other embodiments, the content request window corresponds to fixed increment of time or increments of time that are predetermined to define the content request window.

Turning now to FIG. 5B, at (1) the user device 102, through a media application, transmits a set of subsequent requests for content to CDN service provider 150. In a manner similar as described in FIGS. 4A-4C, each request for content can be generated by a user device 102 responsive to a previous identification of available content segments or sub-portions and receipt of the previously requested segment (e.g., identifying the next byte range to be requested). In some embodiments, the streaming of content may be temporarily paused, so the subsequent transmissions may be dependent on receipt of the previous received segment. As described above, each individual user device request includes some identification information that corresponds to a stateless media application on the user device. Such information includes host name, path, user agent or media application identification information, network address of the user device, and requested byte range information identifying the specific requested segment of content.

As part of the interaction at (1), the CDN service provider 150 processes the request to determine the requested content segment and causes the preparation of one or more components for transmission of the requested content to the user device 102. Such processing can include additional steps and components not described herein.

At (2), the CDN service provider 150 transmits at least one content request information received from the user device 102. The CDN service provider can transmit each response responsive to the processing of the corresponding segment request. Alternatively, the CDN service provider 150 can batch the requests, such as in a set of log files that are transmitted to the content delivery service 120. The transmissions or results may not necessarily be in the order in which the request was received by the CDN service provider 150.

At (3), the content processing component 124 processes the next content request by attempting to determine whether reference identifier has been previously assigned. During each respective receipt of content request or based on a collection of a set of requests, the content processing component 124 processes the requests to determine whether the content requests should be grouped together. As described herein, once no additional content requests are received within the context of the time window (e.g., the sliding time window), the content processing component 124 will consider the grouping of content requests closed. More specifically, at (4), the content processing component 124 processes each subsequently received content request from as corresponding to the same request if the request is received within the time window, which can be generally referred to as a sliding time window. The time window adjusts with each received request such that the latest received request represents a starting point for the time window. The process repeats until no additional content request is received within the last adjustment of the time window. The adjustment of the timing window can incorporate pausing or repeated requests, which is generally considered to be part of the same request.

Illustratively, once the last request is considered to be detected (e.g., the expiration of the time window), the content processing component 124 can consider the streaming request complete or otherwise terminated. At (5), the content processing component 124 generates a processing result related to the grouping of content requests. The processing result can include an identification of the number of requested segments, a number of repeated segments or adjusted transmissions, performance information associated with transmissions (including network and service performance metrics), attributed costs for the transmission in terms of resources consumed, and the like. The content request usage information can be transmitted, stored or otherwise processed based on different configurations.

Figure 6:
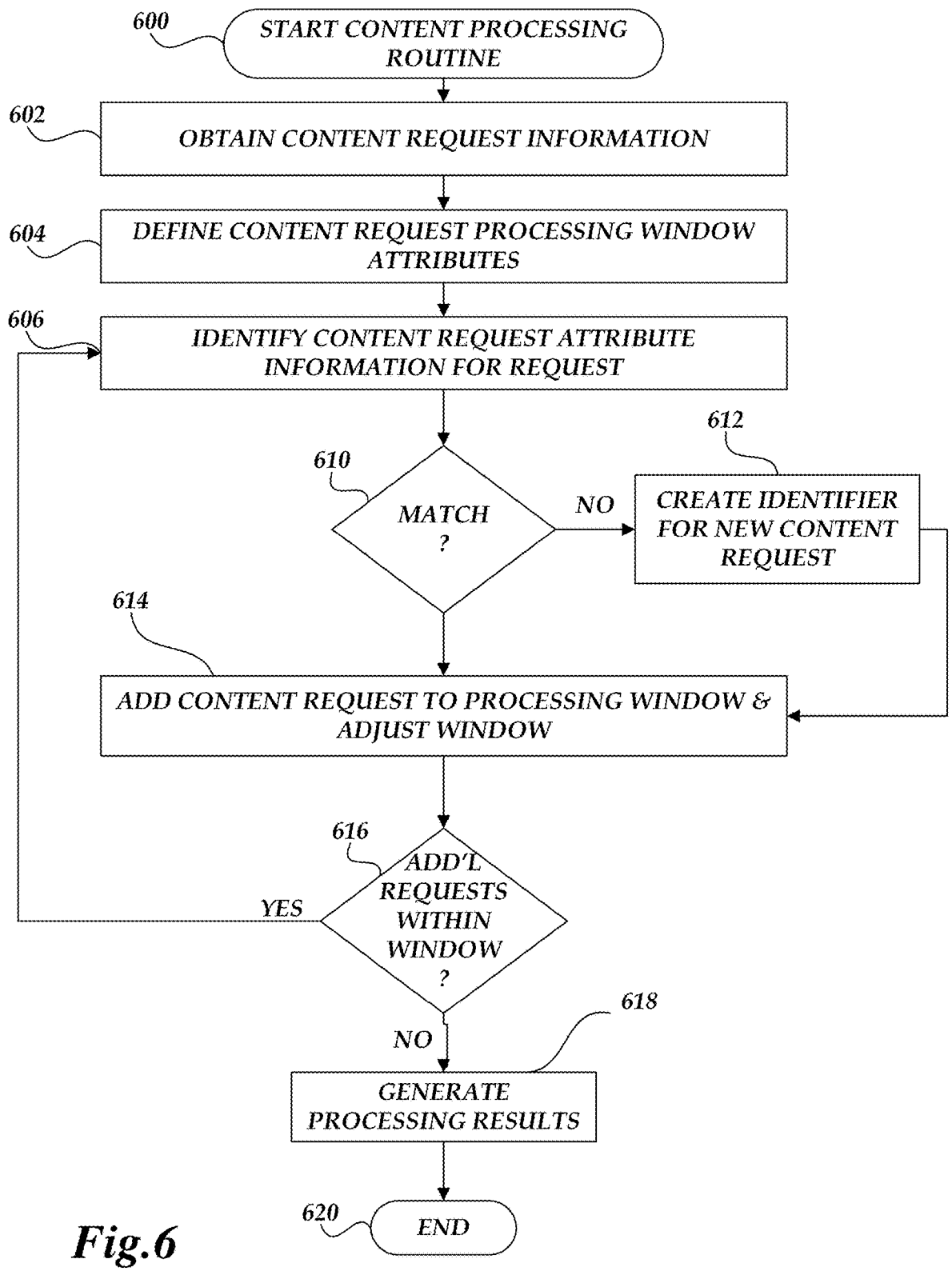
FIG. 6 is a flow diagram illustrative of content request processing routine implemented by a content processing component.

Turning now to FIG. 6, a routine 600 for processing content requests will be described. Routine 600 is illustratively implemented by the content delivery service 120 responsive to a request. At block 602, the content processing component obtains content request information. Illustratively, the request for content can be generated by a user device 102 responsive to the previous response identifying the available content segments or sub-portions and receipt of the previously requested segment (e.g., identifying the next byte range to be requested). In some embodiments, the streaming of content may be temporarily paused, so the subsequent transmissions may be dependent on receipt of the previous received segment. As described above, each individual user device request includes some identification information that corresponds to a stateless media application on the user device. Such information includes host name, path, user agent or media application identification information, network address of the user device, and requested byte range information identifying the specific requested segment of content. In other embodiments, the request can be transmitted from the CDN service provider 150.

At block 604, the content processing component 124 defines that content request window that will be utilized to associate all content requests with a common identifier as corresponding to a "same" request. Illustratively, the content request window corresponds to a length of time defined by a minimal length of the total streamed content. In other embodiments, the content request window corresponds to a multiple of the length of the total streamed content. Still further, in other embodiments, the content request window corresponds to fixed increment of time or increments of time that are predetermined to define the content request window.

At block 606, the content processing component identifies content request information from the content request. Illustratively, the content processing component 124 associates a unique identifier, such as an assigned global identifier, hash, partial hash and the like with one or more attributes of the content request. For example, the content processing component 124 can associated the reference identifier with network address and user agent identifier of the users. As will be described below, the reference identifier will be assigned to all subsequently received content requests having matching attributes. The reference identifier is illustratively utilized by the content processing component 124 and is not provided to the user device 102. Additionally, the reference identifier is not included in any subsequent user content requests because the media application does not support stateful tracking (e.g., cookies or other identifiers) or otherwise such stateful tracking is not enabled.

At decision block 610, a test is conducted to determine whether the attribute information corresponds or matches an existing reference identifier. If not, the content processing component 124 can assume that this is the first of a new request. At block 614, the content processing component 124 generates a new unique identifier. Such an embodiment may occur if the content request is a new request or based on a delay more than the timing window.

At block 614, the content processing component 124 processes the next content request by attempting to determine whether reference identifier has been previously assigned. For example, the content processing component 124 can associated the reference identifier with network address and user agent identifier of the users. Illustratively, all content requests received with a specified time window will be given the same reference identifier based on matching attributes. As described above, the content streaming application 122 illustratively transmits the requested content segment and initializes a set of subsequent requests/transmissions corresponding to the streamed content.

During each respective receipt of content request or based on a collection of a set of requests, the content processing component 124 processes the requests to determine whether the content requests should be grouped together. As described herein, once no additional content requests are received within the context of the time window (e.g., the sliding time window), the content processing component 124 will consider the grouping of content requests closed. More specifically, at decision block 616, the content processing component 124 conducts a test to determine whether additional content requests have been received. If so, the content processing component 124 processes each subsequently received content request from as corresponding to the same request if the request is received within the time window, which can be generally referred to as a sliding time window. The time window adjusts with each received request such that the latest received request represents a starting point for the time window. The process repeats until no additional content request is received within the last adjustment of the time window. The adjustment of the timing window can incorporate pausing or repeated requests, which is generally considered to be part of the same request. Illustratively, once the last request is considered to be detected (e.g., the expiration of the time window), the content processing component 124 can consider the streaming request complete or otherwise terminated.

At block 618, the content processing component 124 generates a processing result related to the grouping of content requests. The processing result can include an identification of the number of requested segments, a number of repeated segments or adjusted transmissions, performance information associated with transmissions (including network and service performance metrics), attributed costs for the transmission in terms of resources consumed, and the like. Illustratively, the unique identifier information can be separated from actual user identity information such that the content usage information can be anonymized with regard to an identity of actual users generating the content request information. In this embodiment, the content delivery system 120 can provide highly detailed individual information without requiring additional processing to anonymize the content request processing information or without requiring compliance with detailed data privacy regulations associated with information including individual identification information. The content request usage information can be transmitted, stored or otherwise processed based on different configurations. Routine 600 terminates at block 620.

Illustratively, the content request usage information may be utilized in a variety of non-limiting manners. As described previously, the processed content request usage information may be utilized to reconcile streaming count information that is provided to content providers for purposes of establishing financial compensation for streaming content or updating accounting/licensing information. In other embodiments, the processed content request usage information can be provided as inputs into user profiling or user tracking systems, such as maintain information regarding specific content accessed, a quantity of time selected content was accessed, specific portions of content that has been accessed or repeated, types of content that have been accessed, and the like. Still further, in other embodiments, the processed content request usage information can be utilized as inputs to a user activity tracking system to determine whether access to requested content elicits a desired user activity or interaction (e.g., did a user access a web resource based on consuming content). Other applications or processing of the processed content request usage information can also be utilized in association with aspects of the present application.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for processing information corresponding to content requests, wherein the content requests correspond to a set of content segments forming streaming content, the system comprising:

one or more computing devices associated with a content processing component, wherein the content processing component is configured to:

receive, at a first time, a first content request for streaming content from a user device, wherein the first content request corresponds to a first content segment included in the set of content segments;

responsive to the received first content request, associate a unique identifier based on a network address and a user agent identifier of the first content request;

determining a sliding time window for receiving additional content requests, the sliding time window defining a fixed time relative to the first time;

receive, from the user device, at a second time that is within the sliding time window, a second content request for streaming content from a user device, wherein the second content request corresponds to a second content segment included in the set of content segments;

responsive to the received second content request:
associate the unique identifier based on a network address and a user agent identifier of the second content request; and
adjust the sliding time window to be lengthened relative to the second time;

determine that no additional content requests have been received during the adjusted sliding time window; and responsive to determining that no additional content requests have been received during the adjusted sliding time window, generate a processing result corresponding to the first and second content request associated with the unique identifier.

2. The system of claim 1, wherein the sliding time window corresponds to a fixed time representative of a minimum threshold.

3. The system of claim 2, wherein the minimum threshold is based on a length of time associated with the set of content segments.

4. The system of claim 1, wherein the processing result corresponds to an identification of at least one of a time of download or result of download.

5. The system of claim 1, wherein an order of the first content and the second content is associated with a sequential order of content requests.

6. The system of claim 1, wherein an order of the first content and the second content is associated with a non-sequential order of content requests.

7. A computer-implemented method for processing content requests comprising:

receiving, within a sliding time window whose initial length is predefined, a plurality of content requests for streaming content from a user device, wherein individual content requests correspond to an identified content segment included in a set of content segments and wherein the individual content requests are associated with a common identifier;

adjusting the sliding time window based on receipt of a most current content request; and generating a processing result corresponding to received content requests associated with the common identifier based a lack of receipt of content requests during the adjusted sliding time window.

8. The computer-implemented method of claim 7 further comprising determining the sliding time window for receiving additional content requests, the sliding time window defining a fixed time.

9. The computer-implemented method of claim 8, wherein the sliding time window corresponds to a fixed time representative of a minimum threshold.

10. The computer-implemented method of claim 9, wherein the minimum threshold is based on a length of time associated with the set of content.

11. The computer-implemented method of claim 7, wherein the common identifier is based on at least one of a network address or media application identifier.

12. The computer-implemented method of claim 11, wherein the common identifier is based on a network address and media application identifier.

13. The computer-implemented method of claim 6, wherein the processing result corresponds to an identification of at least one of a time of download or result of download.

14. A computer-implemented method for processing content requests comprising:

receiving a plurality of content requests for streaming content from a user device, wherein individual content requests correspond to an identified content segment included in a set of content segments and wherein the individual content requests are associated with a unique identifier;

associating individual content requests from the plurality of requests based on a matching of attributes of the individual content requests and receipt of content requests prior to expiration of a current time window, wherein the current time window is adjusted to be a longer time window based on receipt of a most current content request relative to a prior one of the plurality of content requests, wherein the longer time window begins at a time the most current content request is received, and ends at a later time;

generating a processing result corresponding to received content requests associated with the common identifier based a lack of receipt of content requests during the longer time window.

15. The computer-implemented method of claim 14 further comprising determining the longer time window for receiving additional content requests, the longer time window defining a fixed time.

16. The computer-implemented method of claim 15, wherein the longer time window corresponds to a multiplier of a time representative of a minimum threshold.

17. The computer-implemented method of claim 16, wherein the unique identifier is based on at least one of a network address or media application identifier.

18. The computer-implemented method of claim 17, wherein the common identifier is based on a network address and media application identifier.

19. The computer-implemented method of claim 14, wherein the processing result corresponds to an identification of at least one of a time of download or result of download.

20. The computer-implemented method of claim 14, wherein individual requests are associated with host name, path, user agent identifiers, network address of the requesting media application, and segment identification information.

* * * * *